(12) United States Patent
Tang et al.

(10) Patent No.: US 9,740,524 B2
(45) Date of Patent: Aug. 22, 2017

(54) METHOD AND TERMINAL DEVICE FOR EXECUTING APPLICATION CHAIN

(71) Applicant: Xiaomi Inc., Beijing (CN)

(72) Inventors: Mu Tang, Beijing (CN); Sitai Gao, Beijing (CN); Xibei Zhang, Beijing (CN); Hao Ye, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 74 days.

(21) Appl. No.: 14/515,542

(22) Filed: Oct. 16, 2014

(65) Prior Publication Data

US 2015/0277991 A1 Oct. 1, 2015

Related U.S. Application Data

(63) Continuation of application No. PCT/CN2014/082878, filed on Jul. 24, 2014.

(30) Foreign Application Priority Data

Mar. 28, 2014 (CN) .......................... 2014 1 0124553

(51) Int. Cl.
*G06F 9/46* (2006.01)
*G06F 9/48* (2006.01)
(Continued)

(52) U.S. Cl.
CPC ........ *G06F 9/4881* (2013.01); *G06F 9/45512* (2013.01); *G06F 9/544* (2013.01)

(58) Field of Classification Search
CPC ..... G06F 9/4881; G06F 9/45512; G06F 9/544
See application file for complete search history.

(56) References Cited

U.S. PATENT DOCUMENTS 7,453,593 B1 11/2008 Parkinson
9,292,045 B2 * 3/2016 Shultz ............... H04M 1/72522
(Continued)

FOREIGN PATENT DOCUMENTS

CN 1794844 A 6/2006
CN 1858707 A 11/2006
(Continued)

OTHER PUBLICATIONS

"International Search Report for PCT/CN2014/082878".
European Search Report for 14193718.5.

*Primary Examiner* — James J Lee
(74) *Attorney, Agent, or Firm* — Jun He Law Offices P.C.; James J. Zhu

(57) ABSTRACT

The present disclosure relates to a method and a terminal device for executing an application chain. The method includes: acquiring a current application to be executed from an application chain; and executing the current application by determining an execution action according to an executable content type of the current application and an execution result of a preceding application executed before the current application. When executing an application chain comprised of multiple applications, the method provides executing the current application by determining the execution action according to the executable content type of the current application and the execution result of the preceding application, such that the resources of execution of the application may be used mutually among all the applications in the application chain, thus providing fast and intelligent operation.

12 Claims, 10 Drawing Sheets

(51) Int. Cl.
    *G06F 9/455*    (2006.01)
    *G06F 9/54*     (2006.01)

(56) References Cited

U.S. PATENT DOCUMENTS

| | | | |
|---|---|---|---|
| 9,448,813 B2* | 9/2016 | Sauve | G06F 9/4443 |
| 9,495,527 B2* | 11/2016 | Hirase | G06F 21/32 |
| 2010/0162182 A1 | 6/2010 | Oh et al. | |
| 2012/0009896 A1* | 1/2012 | Bandyopadhyay | G06F 1/1643 455/411 |
| 2013/0038541 A1* | 2/2013 | Bakker | G06F 3/0482 345/173 |
| 2013/0191910 A1 | 7/2013 | Dellinger et al. | |
| 2014/0149920 A1* | 5/2014 | Wang | G06F 3/0482 715/783 |
| 2014/0237426 A1* | 8/2014 | Terazono | G06F 3/04817 715/810 |

FOREIGN PATENT DOCUMENTS

| | | |
|---|---|---|
| CN | 1859520 A | 11/2006 |
| CN | 101582943 A | 11/2009 |
| CN | 102457603 A | 5/2012 |
| CN | 102801851 A | 11/2012 |
| CN | 102982064 A | 3/2013 |
| CN | 103402189 A | 11/2013 |
| CN | 103473030 A | 12/2013 |
| CN | 103927224 A | 7/2014 |
| CN | 103942047 A | 7/2014 |
| EP | 1698969 A2 | 9/2006 |
| EP | 1698969 A3 | 11/2007 |
| JP | 09223002 A | 8/1997 |
| JP | 2006244471 A | 9/2006 |
| JP | 2007317032 A | 12/2007 |
| JP | 2009530707 A | 8/2009 |
| JP | 2013534121 A | 8/2013 |
| JP | 2014017011 A | 1/2014 |
| KR | 1020060096271 | 9/2006 |
| RU | 2313126 C2 | 12/2007 |
| WO | 2007/106259 A1 | 9/2007 |
| WO | 2010/109849 A1 | 9/2010 |
| WO | 2013109926 A1 | 7/2013 |

* cited by examiner

METHOD AND TERMINAL DEVICE FOR EXECUTING APPLICATION CHAIN

CROSS REFERENCE TO RELATED APPLICATIONS

The present application is a Continuation of International Application No. PCT/CN2014/082878, filed Jul. 24, 2014, which is based on and claims the priority of Chinese patent application No. 201410124553.8, filed Mar. 28, 2014, the entire contents of which are incorporated herein by reference.

TECHNICAL FIELD

The present disclosure relates to the field of electronic devices, and more particularly, to a method and a terminal device for executing an application chain.

BACKGROUND

In related technologies, most mobile terminals have a touch screen and merely a few physical buttons. In order to avoid accidental touch of the touch screen, when the mobile terminal is not in use, the touch screen of the mobile terminal needs to be set to a locked state. When the mobile terminal is in use, the touch screen needs to be unlocked first and then controls the mobile terminal through the touch screen.

As a result of having too few physical buttons, only a limited number of functions can be controlled, and most operations can only be achieved with the help of the touch screen. Therefore, every time the mobile terminal is used, the operations of lightening the screen, unlocking the screen, selecting the application and executing the function need to be carried out, which can be very tedious with poor time management, thus consuming a considerable amount of operation time.

SUMMARY

The present disclosure provides a method and terminal device for executing an application chain.

According to a first aspect of the embodiments of the present disclosure, a method for executing an application chain comprises: acquiring a current application to be executed from an application chain; and executing the current application by determining an execution action according to an executable content type of the current application and an execution result of a preceding application executed before the current application.

According to a second aspect of the embodiments of the present disclosure, a terminal device for executing an application chain comprises: one or more processors; a memory for storing one or more instruction modules configured to be executed by the one or more processors, the one or more instruction modules comprising instructions for: acquiring a current application to be executed from an application chain; and executing the current application by determining an execution action according to an executable content type of the current application and an execution result of a preceding application executed before the current application.

According to a third aspect of the embodiments of the present disclosure, a non-transitory computer-readable storage medium has stored therein instructions that, when executed by one or more processors of a terminal device, causes the terminal device to perform a method for executing an application chain, wherein the method comprises: acquiring a current application to be executed from an application chain; and executing the current application by determining an execution action according to an executable content type of the current application and an execution result of a preceding application executed before the current application.

According to a fourth aspect of the embodiments of the present disclosure, an apparatus for executing an application chain comprises: an application acquiring unit for acquiring a current application to be executed from an application chain; and a processing unit for executing the current application by determining an execution action according to an executable content type of the current application and an execution result of a preceding application executed before the current application.

The technical solutions provided by the embodiments of the present disclosure may include the following advantageous effect: when executing an application chain comprised of multiple applications, the method provides executing the current application by determining the execution action according to the executable content type of the current application and the execution result of the preceding application, such that the resources of execution the application may be used mutually among all the applications in the application chain, thus providing fast and intelligent operation.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this description, illustrate embodiments according with the present disclosure and together with the description serve to explain the principle of the present disclosure.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure, instead they are merely examples of apparatuses and methods consistent with aspects related to the disclosure as recited in the appended claims.

Figure 1:
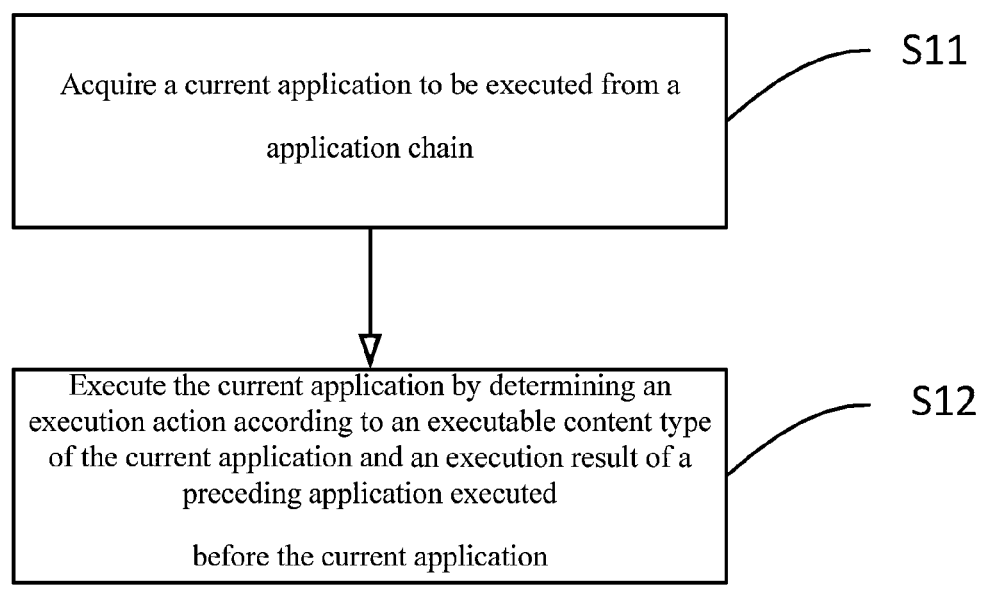
FIG. 1 is a flowchart of a method for executing an application chain according to an exemplary embodiment of the present disclosure.

FIG. 1 is a flowchart of a method for executing an application chain according to an exemplary embodiment. As shown in FIG. 1, the method for executing the application chain is used in a terminal device, including the following steps.

In step S11, a current application to be executed is acquired from an application chain. The application chain includes a series of applications, one of which is the current application to be executed. Therefore, the terminal device need to decide which application is the current application to be executed in step S11.

In step S12, the current application is executed by determining an execution action according to an executable content type of the current application and an execution result of a preceding application executed before the current application.

In one exemplary embodiment, the method further includes: acquiring a preset application chain after detecting an execution instruction of the application chain; determining the current application in sequence according to a sequence of application commands in the application chain; and replacing a succeeding application of the current application in the application chain as the current application after detecting that the current application has been executed or has begun to be executed, until all the applications in the application chain have been executed.

In one exemplary embodiment, the application chain is preset prior to execution of the applications. At the time of presetting the application chain, the application chain is preset by detecting an addition instruction of adding an application in an application chain setting page, displaying an optional application identifier for adding an optional application, and adding a selected optional application identifier to the application chain. In this case, the optional application identifier is used for identifying and initiating a corresponding application.

Figure 2:
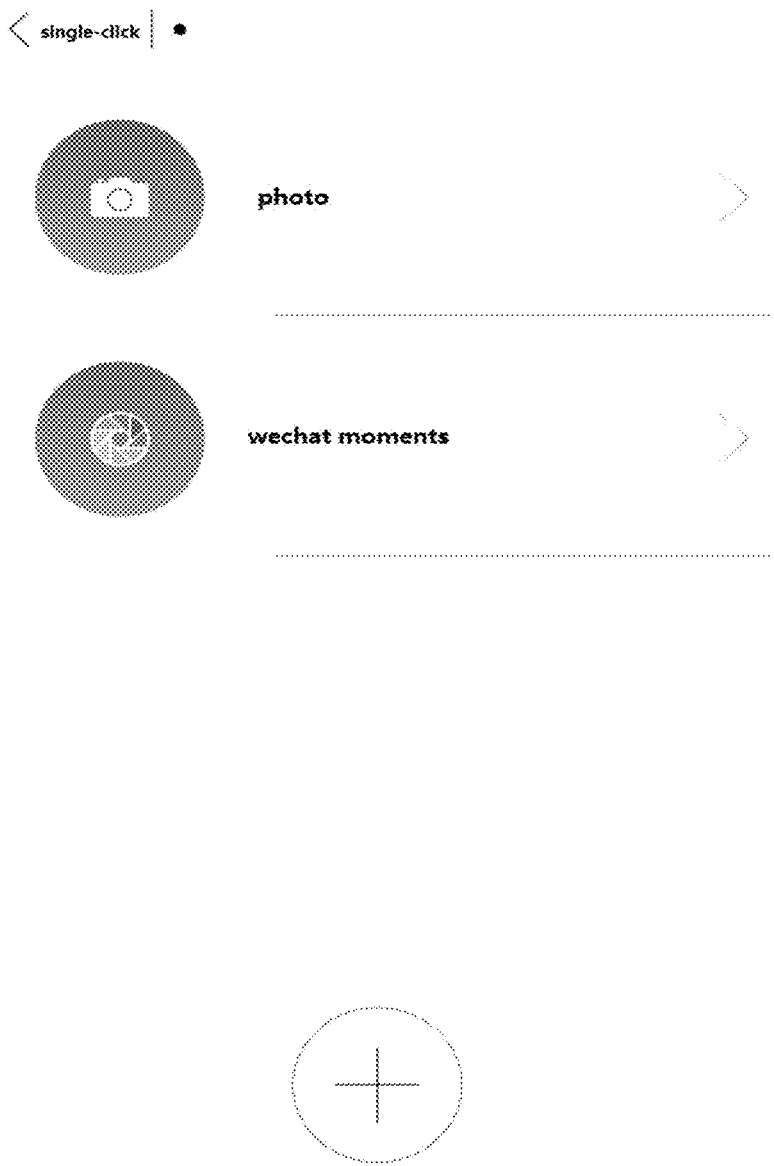
FIG. 2 is a schematic diagram of an operation interface according to an exemplary embodiment of the present disclosure.

FIG. 2 illustrates an exemplary user interface for presetting an application chain corresponding to the action of "single-tap". As shown in FIG. 2, assuming there is only a photo application in the "single-tap" application chain and the photo application uses "Photo" as the application identifier. In FIG. 2, there is also an application addition button "+", which can be clicked to generate an addition instruction. When the application addition button is clicked, an optional application identifier for adding applications is displayed at the "single-tap" application chain. The optional application identifier may be in the form of word, figure and the combination thereof. For example, assuming the selected optional application identifier is an identifier "WeChat moments" ("WeChat moments" is a sub-application of a message chatting application where you can share your life stream with friends), then the selected optional application identifier "WeChat moments" will be added and displayed in the application chain, located below the "Photo" application.

In one embodiment, at the time of setting the application chain, the application chain is preset by detecting a movement instruction for any one of the optional application identifiers and moving the selected optional application identifier to a target sequence position. In this case, an execution sequence of the application corresponding to the moved optional application identifier moves to the target sequence position accordingly.

After the application chain corresponding to a specific action or event is set, the application chain will be performed in case that the specific action or event is activated. For example, after the "single-tap" application chain is set, the applications in the "single-tap" application chain will be performed when the user performs a "single-tap" action on some part (such as a "single-tap" action on the touch screen) of the terminal device when the terminal device in a locked state.

In one embodiment, the step S11 of acquiring the current application to be executed from the application chain includes: acquiring the current application to be executed from the application chain after detecting that the preceding application has been executed or the preceding application has begun to be executed. As shown in FIG. 2, the current application to be executed in the application chain is determined as the "Photo" application firstly when initiating the execution of the application chain by triggering execution instructions such us "single-tap". The current application is the first application in the application chain, so the action of taking photos is executed directly. Then, the next application (such as a "Share" application) in the application chain is acquired as the current application.

In one embodiment, the step S12 of executing the current application by determining an execution action according to an executable content type of the current application and an execution result of a preceding application executed before the current application includes: acquiring the executable content type of the current application and the execution result of the preceding application executed before the current application; determining whether the execution result of the preceding application belongs to the executable content type of the current application; replacing the execution result of the preceding application as the content of the execution action of the current application and executing the execution action if the execution result of the preceding application belongs to the executable content type of the current application; and executing the current application if the execution result of the preceding application does not belong to the executable content type of the current application.

For example, when the executable content type of the current application includes pictures and multimedia information, if the execution result of the preceding application executed before the current application is generating pictures and/or multimedia information, then the generated pictures and/or multimedia information is served as the execution content at the time of executing the current application. Take FIG. 2 as an example, the content executed by the current application is to share the pictures, and the execution result of the preceding application photo in the application chain is generating pictures, and then the pictures generated by the preceding application may be shared directly and the users do not need to choose the generated pictures again. If there are other applications between the two applications shown in FIG. 2, such as a "Record"

application, it will not affect the picture sharing action. Because all the preceding applications may be traversed at the time of determining the preceding application. Of course, it may be provided to only acquire the preceding application.

In one embodiment, the step S12 of executing the current application by determining an execution action according to an executable content type of the current application and an execution result of a preceding application executed before the current application includes: acquiring the executable content type of the current application and the execution result of the preceding application executed before the current application; determining whether the executable content type of the current application belongs to the executable content type of a preceding application if the execution result of the preceding application is in execution; and sending the execution result of the current application to the preceding application in execution while executing the current application if the executable content type of the current application belongs to the executable content of the preceding application. For example, the executable content type of the preceding application command includes pictures and multimedia information, and when the execution result of the preceding application is in execution, if pictures and/or multimedia information is generated when the current application is executed, then the execution result of the current application is sent to the preceding application in execution while executing the current application.

Figure 3:
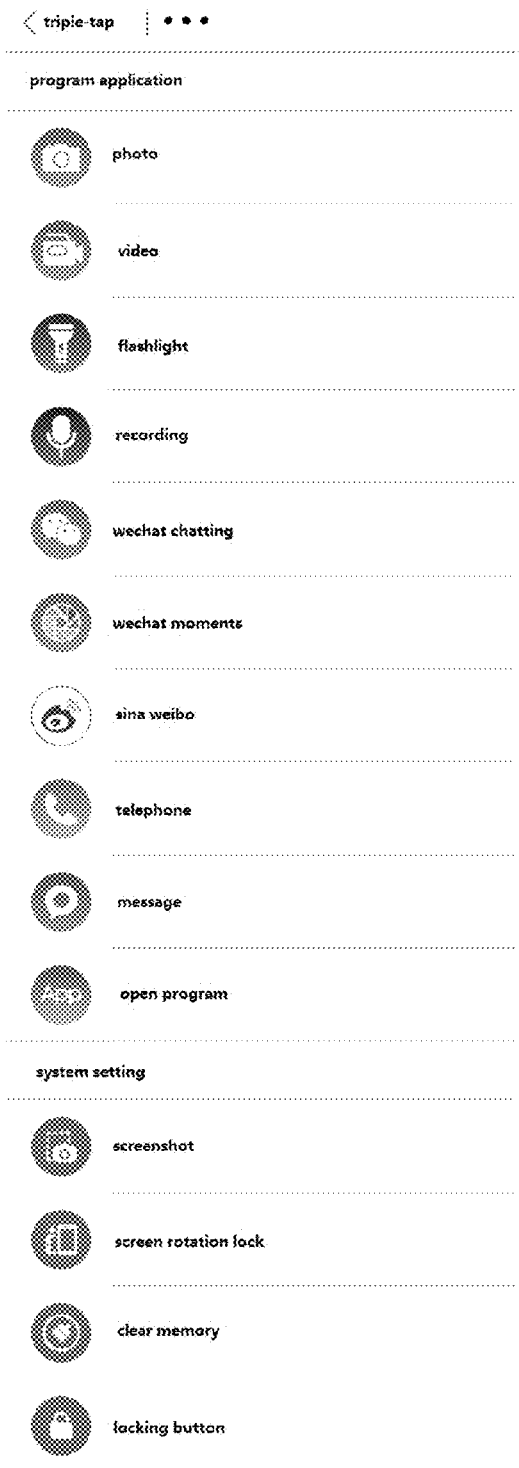
FIG. 3 is a schematic diagram of an operation interface according to an exemplary embodiment of the present disclosure.

Take FIG. 3 as an example, the applications in sequence in the "triple-tap" application chain are: "Photo", "Video", "Flashlight", "Recording", "WeChat chatting", "WeChat moments", "Sina WeiBo", "Making a telephone call", "Sending a message" and "Opening an application". When the "triple-tap" application chain is executing and "Recording" application is being executed, the record function is initiated and begins to record at this time. When the subsequent application "Making a telephone call" in the application chain is to be executed, it is detected that the audio content generated by "Making a telephone call" application may be captured by the record function, then the audio of the call will be sent to the "Recording" application to be processed. After the call is finished, a notification may be popped up to allow the user to confirm whether to end the "Recording" application. Certainly, the process of recording may also be ended automatically after all the applications in the "triple-tap" application chain have been executed. Alternatively, when the "WeChat moments" application for sharing contents are being executed, pictures generated by the "Photo" application, images generated by the "Video" application and audio generated by the "Recording" application are set as contents to be shared, and the application chain will skip to the sharing page with the recording being ended at this time. Alternatively, the recording procedure will continue if determining the "WeChat moments" application does not support audio information, and the recording procedure will not be ended until an application supporting the audio information is executed.

In one embodiment, at the time of executing the current application, an interface of the current application is displayed. Take FIG. 3 as an example, a photo interface is displayed and photos are taken automatically and saved at the time of executing the "Photo" application. The sharing page in the WeChat moments is displayed, the generated picture is set as the sharing content, then the picture are uploaded after receiving a corresponding confirmation instruction, or the generated picture are uploaded as sharing content directly at the time of executing the "WeChat moments" application. Similarly, a dial interface is displayed at the time of executing the "Communication" application.

From the above description, it can be seen that the method provided by the embodiments of the present disclosure, when executing an application chain comprised of multiple applications, the method provides executing the current application by determining the execution action according to the executable content type of the current application and the execution result of the preceding application, such that the resources of execution the application may be used mutually among all the applications in the application chain, thus providing fast and intelligent operation.

Figure 4:
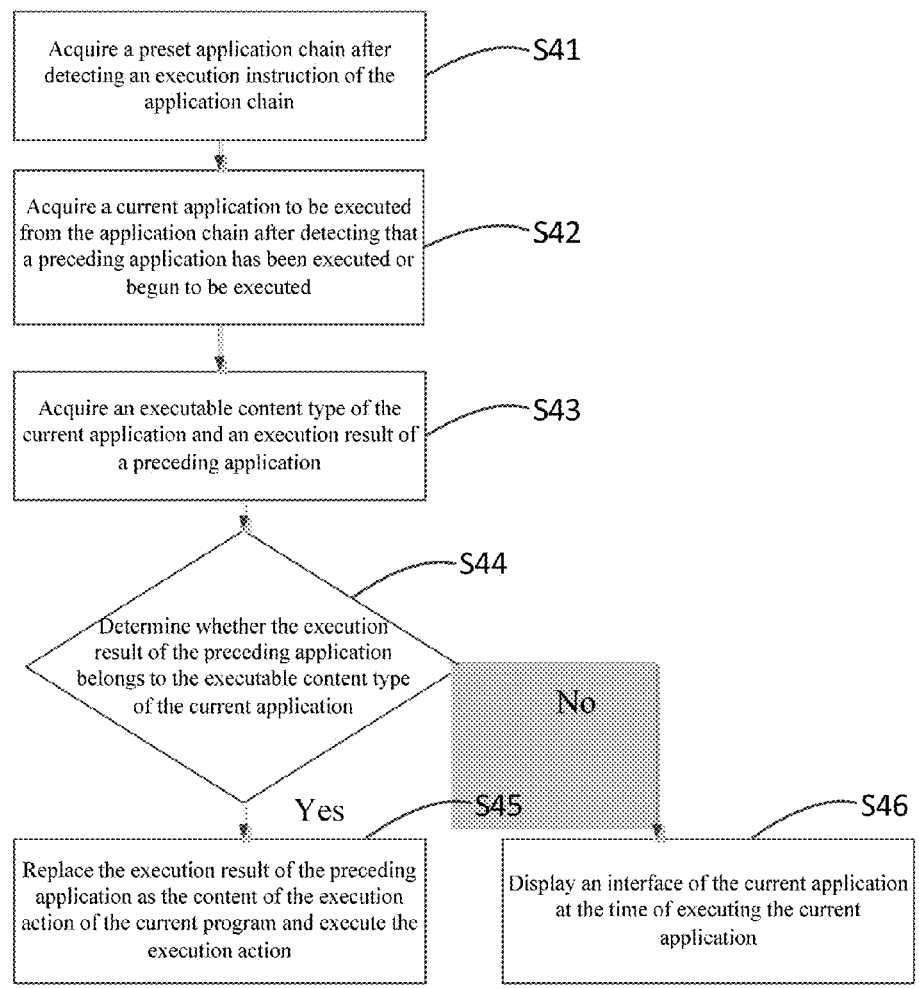
FIG. 4 is a flowchart of a method for executing an application chain according to an exemplary embodiment of the present disclosure.

Take FIG. 2 as an example, a further description is made to the method for executing an application chain provided by the present disclosure. FIG. 4 is a flowchart of a method for executing the application chain according to an exemplary embodiment. As shown in FIG. 4, the method for executing the application chain is used in a terminal device, and includes the following steps.

In step S41, a preset application chain is acquired after detecting an execution instruction of the application chain.

In step S42, a current application to be executed from the application chain is acquired after detecting that a preceding application has been executed or the preceding application has begun to be executed.

For example, the current application is determined as the "WeChat moments" application according to the sequence of the application commands in the application chain after detecting that the "Photo" application is executed.

In step S43, an executable content type of the current application and an execution result of the preceding application executed before the current application are acquired.

For example, the executable content type of the current application is a picture, and the execution result of the preceding application is generating a picture.

In step S44, whether the execution result of the preceding application belongs to the executable content type of the current application is determined; if yes, then the method proceeds to step S45, otherwise the current application is executed and the method proceeds to step S46.

For example, when the executable content type of the current application includes pictures and multimedia information, if the execution result of the preceding application executed before the current application is generating pictures and/or multimedia information, then the generated pictures and/or multimedia information is served as the execution content at the time of executing the current application.

In step S45, the execution result of the preceding application is replaced as the content of the execution action of the current application and the execution action is executed.

In step S46, an interface of the current application is displayed at the time of executing the current application.

From the above description, it can be seen that when executing an application chain comprised of multiple applications, the method provides executing the current application by determining the execution action according to the executable content type of the current application and the execution result of the preceding application, such that the resources of execution the application may be used mutually among all the applications in the application chain, thus providing fast and intelligent operation.

Figure 5:
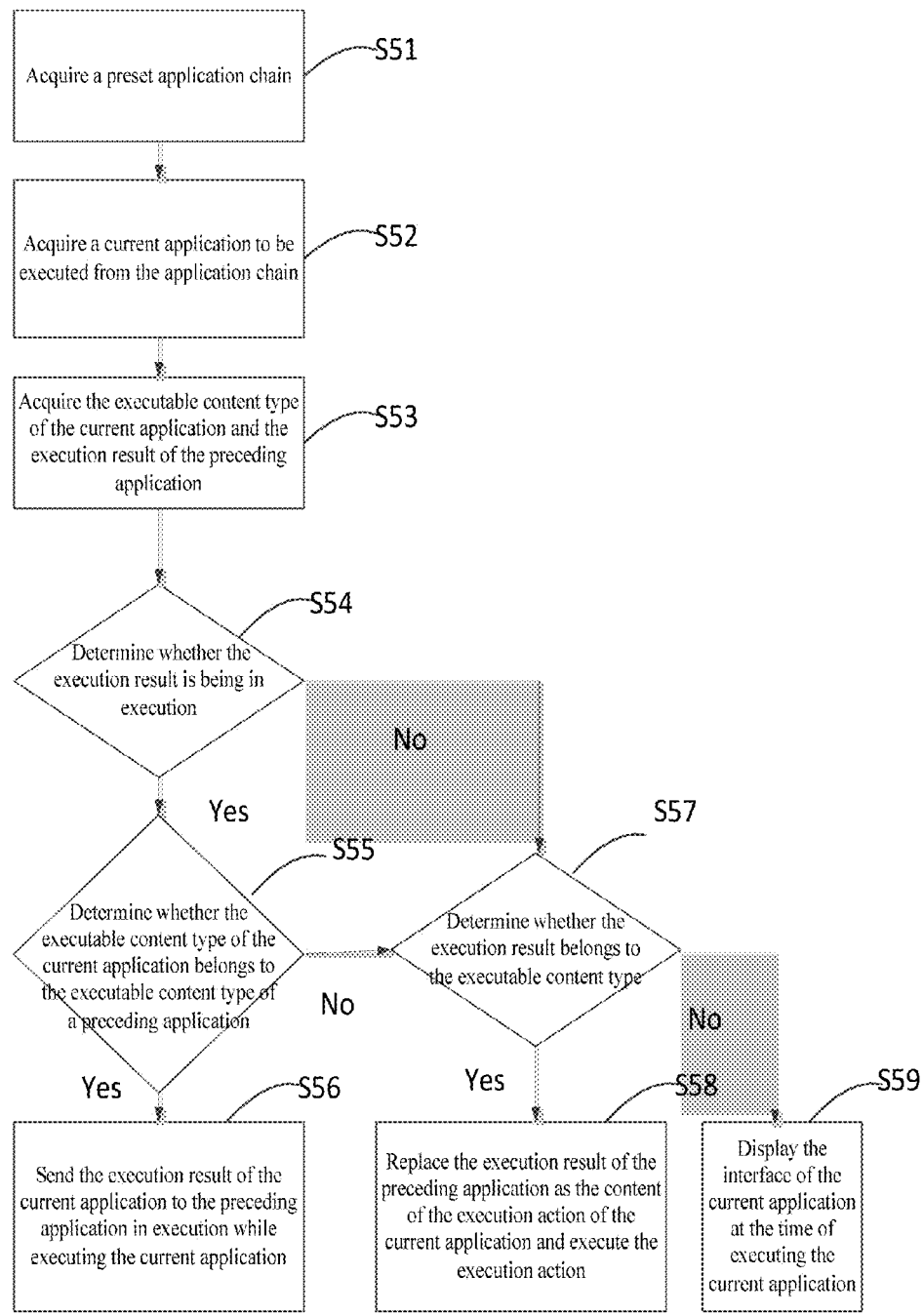
FIG. 5 is a flowchart of a method for executing an application chain according to an exemplary embodiment of the present disclosure.

Take FIG. 3 as an example, a further description is made to the method for executing an application chain provided by the present disclosure. FIG. 5 is a flowchart of a method for executing the application chain according to an exemplary embodiment. As shown in FIG. 5, the method for executing the application chain is used in a terminal device, and includes the following steps.

In step S51, a preset application chain is acquired after detecting an execution instruction of the application chain.

In step S52, a current application to be executed from the application chain is acquired after detecting that a preceding application has been executed or the preceding application has begun to be executed.

In step S53, an executable content type of the current application and an execution result of the preceding application executed before the current application are acquired.

In step S54, whether the execution result of the preceding application belongs to the executable content type of the current application is determined; if yes, then the method proceeds to step S55, otherwise the current application is executed and the method proceeds to step S57.

In step S55, whether the executable content type of the current application belongs to the executable content type of a preceding application is determined; if yes, then the method proceeds to step S56; otherwise the method proceeds to step S57.

In step S56, the execution result of the current application is sent to the preceding application in execution while executing the current application, then the method proceeds to step S59.

In step S57, whether the execution result of the preceding application belongs to the executable content type of the current application is determined; if yes, then the method proceeds to step S58, otherwise the current application is executed and the method proceeds to step S59.

For example, when the executable content type of the current application includes pictures and multimedia information, if the execution result of the preceding application executed before the current application is generating pictures and/or multimedia information, then the generated pictures and/or multimedia information is used as the execution content at the time of executing the current application.

In step S58, the execution result of the preceding application is replaced as the content of the execution action of the current application and the execution action is executed.

In step S59, the interface of the current application is displayed at the time of executing the current application.

From the above description, it can be seen that when executing an application chain comprised of multiple applications, the method provides executing the current application by determining the execution action according to the executable content type of the current application and the execution result of the preceding application, such that the resources of execution the application may be used mutually among all the applications in the application chain, thus providing fast and intelligent operation.

Figure 6:
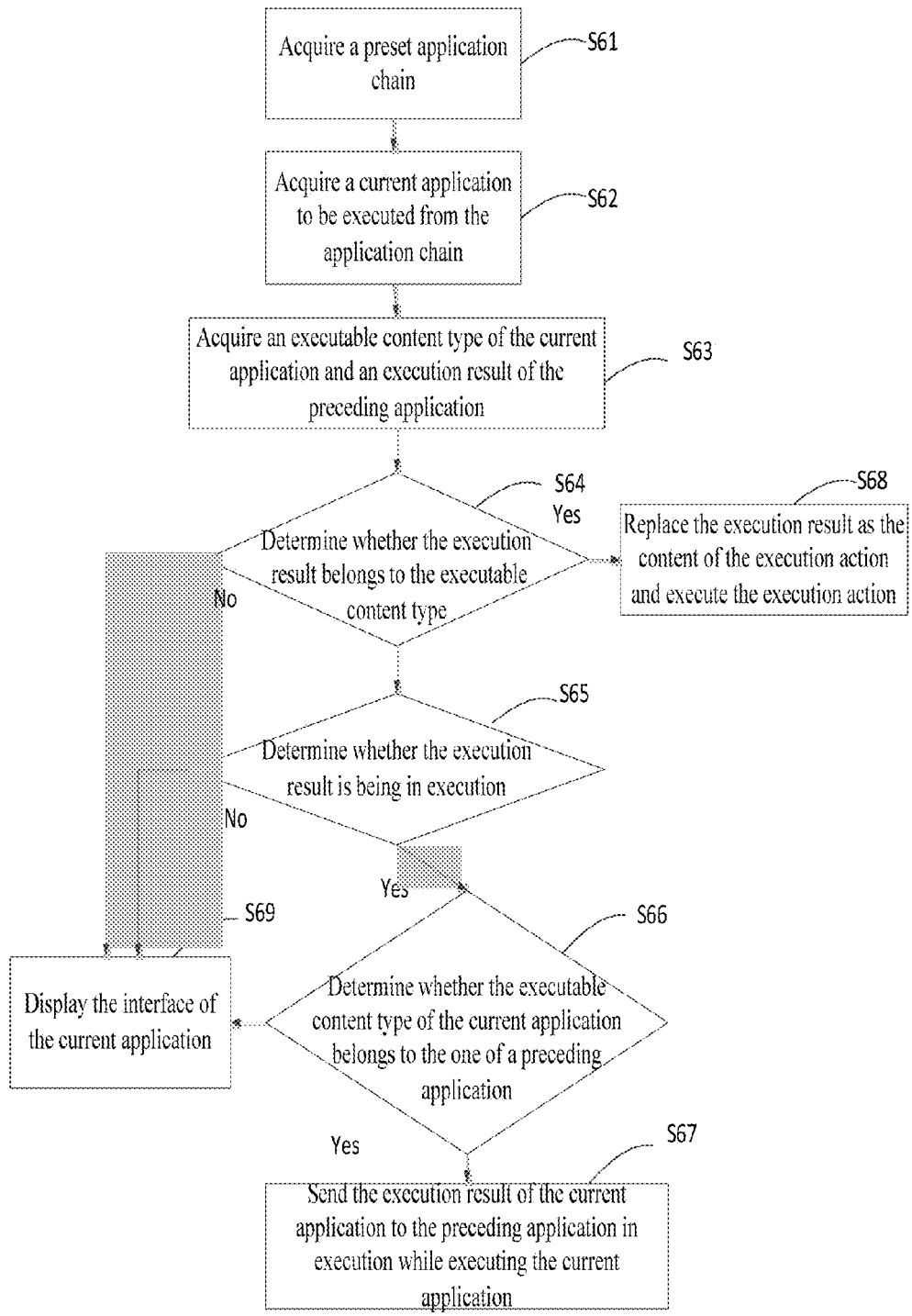
FIG. 6 is a flowchart of a method for executing an application chain according to an exemplary embodiment of the present disclosure.

Take FIG. 3 as an example, a further description is made to the method for executing an application chain provided by the present embodiment. FIG. 6 is a flowchart of a method for executing the application chain according to an exemplary embodiment. As shown in FIG. 6, the method for executing the application chain is used in a terminal device, and includes the following steps.

In step S61, a preset application chain is acquired after detecting an execution instruction of the application chain.

In step S62, a current application to be executed from the application chain is acquired after detecting that a preceding application has been executed or the preceding application has begun to be executed.

In step S63, an executable content type of the current application and an execution result of the preceding application executed before the current application are acquired.

In step S64, whether the execution result of the preceding application belongs to the executable content type of the current application is determined; if yes, then the method proceeds to step S68, otherwise the current application is executed and the method proceeds the step S69. Meanwhile the method continues to execute the step S65.

In step S65, whether the execution result of the preceding application is being executed is determined, if yes, then proceed to step S66; otherwise proceed to step S69.

In step S66, whether the executable content type of the current application belongs to the executable content type of a preceding application is determined; if yes, then the method proceeds to step S67; otherwise the method proceeds to step S69.

In step S67, the execution result of the current application is sent to the preceding application in execution while executing the current application. The step S69 is executed again.

In step S68, the execution result of the preceding application is replaced as the content of the execution action of the current application and the execution action is executed.

In step S69, the interface of the current application is displayed at the time of executing the current application.

From the above description, it can be seen that when executing an application chain comprised of multiple applications, the method provides executing the current application by determining the execution action according to the executable content type of the current application and the execution result of the preceding application, such that the resources of execution the application may be used mutually among all the applications in the application chain, thus providing fast and intelligent operation.

Figure 7:
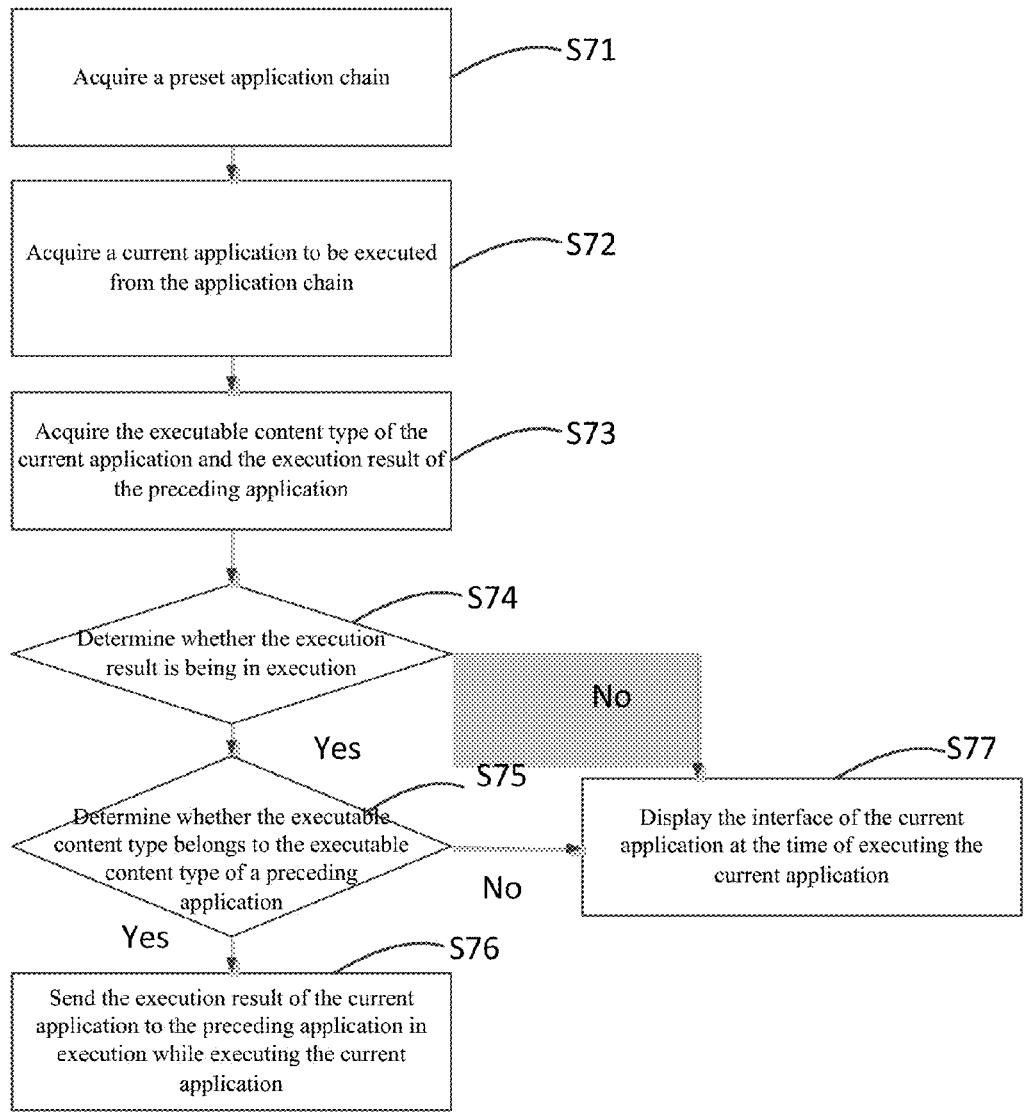
FIG. 7 is a flowchart of a method for executing an application chain according to an exemplary embodiment of the present disclosure.

Take FIG. 3 as an example, a further description is made to the method for executing an application chain provided by the present disclosure. FIG. 7 is a flowchart of a method for executing the application chain according to an exemplary embodiment. As shown in FIG. 7, the method for executing the application chain is used in a terminal device, and includes the following steps.

In step S71, a preset application chain is acquired after detecting an execution instruction of the application chain.

In step S72, a current application to be executed from the application chain is acquired after detecting that a preceding application has been executed or the preceding application has begun to be executed.

For example, the application corresponding to the currently executed application "WeChat chatting" is acquired from the application chain according to the sequence of the application commands in the application chain after detecting that the application corresponding to "Video" has begun to be executed.

In step S73, an executable content type of the current application and an execution result of the preceding application command executed before the current application are acquired.

In step S74, whether the execution result of the preceding application is being in execution is determined; if yes, then the method proceeds to step S75; otherwise, the method proceeds to step S77.

In step S75, whether the executable content type of the current application belongs to the executable content type of a preceding application is determined; if yes, then the method proceeds to step S76; otherwise the current application is executed and the method proceeds to step S77.

For example, after detecting that the execution result of the "Recording" application is being executed, and the current application is the "Communication" application, then the generated audio may be captured by the "Recording" application.

In step S76, the execution result of the current application is sent to the preceding application in execution while executing the current application. For example, the communication audio is sent to the "Recording" application.

In step S77, the interface of the current application is displayed at the time of executing the current application.

From the above description, it can be seen that when executing an application chain comprised of multiple applications, the method provides executing the current application by determining the execution action according to the executable content type of the current application and the execution result of the preceding application, such that the resources of execution the application may be used mutually among all the applications in the application chain, thus providing fast and intelligent operation.

Figure 8:
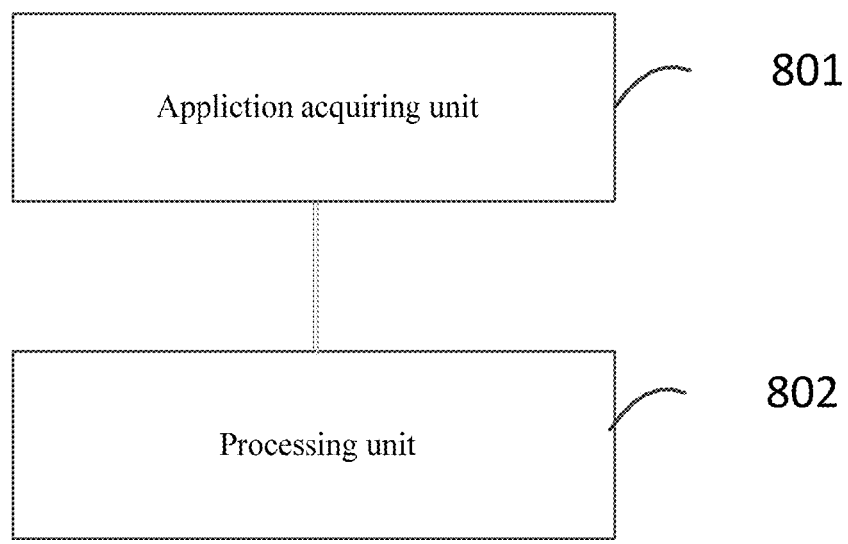
FIG. 8 is a schematic diagram of a terminal device for executing an application chain according to an exemplary embodiment of the present disclosure.

FIG. 8 is a schematic diagram of an apparatus for executing an application chain according to an exemplary embodiment. Referring to FIG. 8, the apparatus includes an application acquiring unit 801 and a processing unit 802.

The application acquiring unit 801 is configured to acquire a current application to be executed from the application chain.

The processing unit 802 is configured to execute the current application by determining an execution action according to an executable content type of the current application and an execution result of a preceding application executed before the current application.

In another embodiment, the apparatus further includes: an application chain acquiring unit 803, which is configured to acquire a preset application chain after detecting an execution instruction of the application chain; and a determining unit 804, which is configured to determine the current application in sequence according to the sequence of application commands in the application chain, and to replace a succeeding application of the current application in the application chain as the current application after detecting that the current application has been executed or has begun to be executed, until all the applications in the application chain have been executed.

In another embodiment, the apparatus further includes: a setting unit 805, which is configured to detect an addition instruction of adding an application in an application chain setting page and to display an optional application identifier for adding an optional application, and then adds a selected optional application identifier to the application chain, wherein the optional application identifier is used for identifying and initiating a corresponding application.

In another embodiment, the apparatus further includes: a moving unit 806, which is configured to detect a movement instruction for any one of the optional application identifiers, and to move a selected optional application identifier to a target sequence position, wherein an execution sequence of the application corresponding to the moved optional application identifier moves to the target sequence position accordingly.

In another embodiment, the apparatus further includes: an application acquiring unit 801, which is configured to acquire the current application to be executed from the application chain after detecting that the preceding application has been executed or the preceding application has begun to be executed.

In another embodiment, the processing unit 802 is configured to acquire the executable content type of the current application and the execution result of the preceding application executed before the current application; determine whether the execution result of the preceding application belongs to the executable content type of the current application; replace the execution result of the preceding application as the content of the execution action of the current application and executing the execution action if the execution result of the preceding application belongs to the executable content type of the current application; and execute the current application if the execution result of the preceding application does not belong to the executable content type of the current application.

The processing unit 802 is also configured to acquire the executable content type of the current application and the execution result of the preceding application executed before the current application; determine whether the executable content type of the current application belongs to the executable content type of a preceding application if the execution result of the preceding application is in execution; and send the execution result of the current application to the preceding application in execution while executing the current application if the executable content type of the current application belongs to the executable content of the preceding application.

In another embodiment, the apparatus further includes: a display unit 807, which is configured to display an interface of the current application at the time of executing the current application.

As for the apparatuses in the above embodiments, the specific manners for performing operations for individual modules thereof have been described in detail in the embodiments regarding the methods, which will not be elaborated herein.

A terminal device for executing an application chain is provided in one embodiment, including: a processor; a memory for storing instructions executable by the processor, for performing a method comprising: acquiring a current application to be executed from an application chain; and executing the current application by determining an execution action according to an executable content type of the current application and an execution result of a preceding application executed before the current application.

Figure 9:
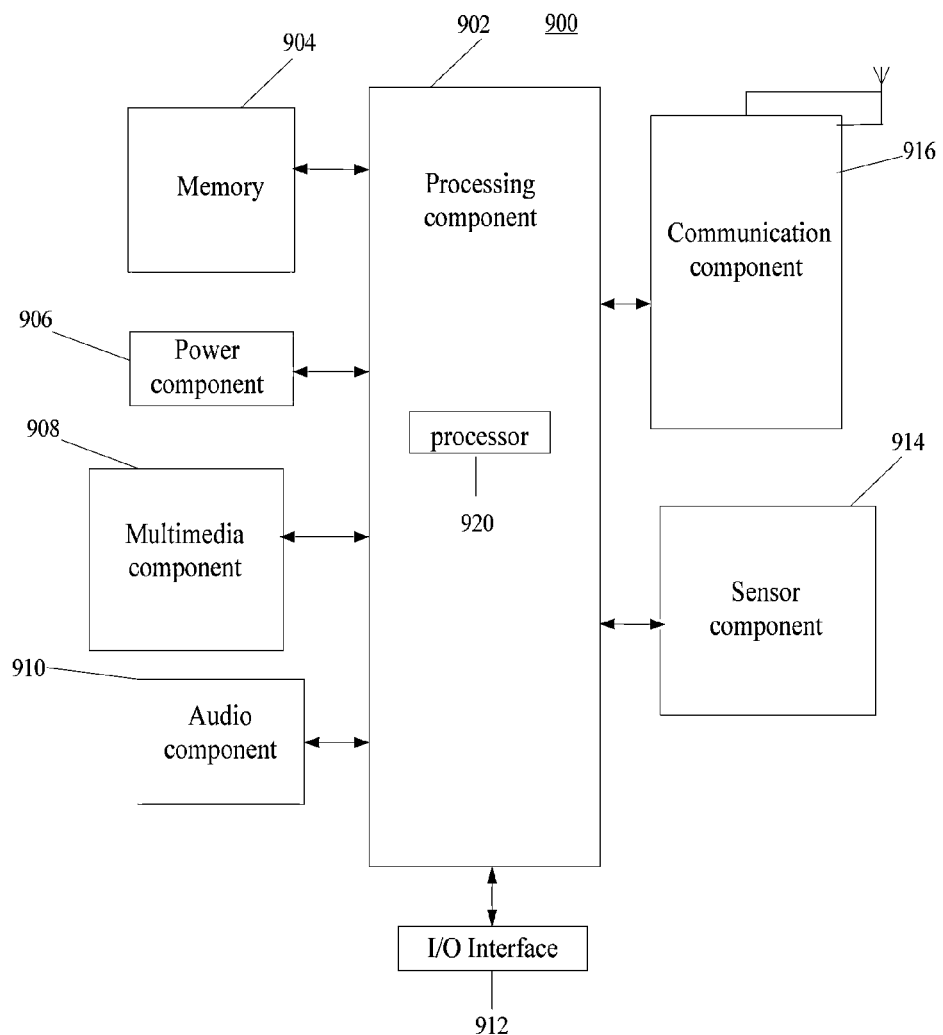
FIG. 9 is a block diagram of a terminal device for executing an application chain according to an exemplary embodiment of the present disclosure.

FIG. 9 is a block diagram of a terminal device 900 for executing an application chain according to an exemplary embodiment. For example, the terminal device 900 may be a mobile phone, a computer, a digital broadcast terminal, a message receiving and sending equipment, a gaming console, a tablet, a medical device, an exercise equipment, a personal digital assistant, and the like.

Referring to FIG. 9, the terminal device 900 may include one or more of the following components: a processing component 902, a memory 904, a power component 906, a multimedia component 908, an audio component 910, an input/output (I/O) interface 912, a sensor component 914, and a communication component 916.

The processing component 902 typically controls overall operations of the terminal device 900, such as the operations associated with display, telephone calls, data communications, camera operations, and recording operations. The processing component 802 may include one or more processors 920 to execute instructions to perform all or part of the steps in the above described methods. Moreover, the processing component 902 may include one or more modules which facilitate the interaction between the processing component 902 and other components. For example, the processing component 902 may include a multimedia module to facilitate the interaction between the multimedia component 808 and the processing component 902.

The memory 904 is configured to store various types of data to support the operation of the terminal device 900. Examples of such data include instructions for any applications or methods operated on the terminal device 900, contact data, phonebook data, messages, pictures, video, etc. The memory 904 may be implemented using any type of volatile or non-volatile memory terminal devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the terminal device 900. The power component 806 may include a power management system, one or more power sources, and any other components associated with the generation, management, and distribution of power in the terminal device 900.

The multimedia component 908 includes a screen providing an output interface between the terminal device 900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front camera and/or a rear camera. The front camera and/or the rear camera may receive an external multimedia datum while the terminal device 900 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 includes a microphone (MIC) configured to receive an external audio signal when the terminal device 900 is in an operation mode, such as a call mode, a recording mode, and a voice recognition mode. The received audio signal may be further stored in the memory 904 or transmitted via the communication component 916. In some embodiments, the audio component 910 further includes a speaker to output audio signals.

The I/O interface 912 provides an interface between the processing component 902 and peripheral interface modules, such as a keyboard, a click wheel, buttons, and the like. The buttons may include, but are not limited to, a home button, a volume button, a starting button, and a locking button.

The sensor component 914 includes one or more sensors to provide status assessments of various aspects of the terminal device 900. For example, the sensor component 914 may detect an open/closed status of the terminal device 900, relative positioning of components, e.g., the display and the keypad, of the terminal device 900, a change in position of the terminal device 900 or a component of the terminal device 900, a presence or absence of user contact with the terminal device 900, an orientation or an acceleration/deceleration of the terminal device 900, and a change in temperature of the terminal device 900. The sensor component 914 may include a proximity sensor configured to detect the presence of nearby objects without any physical contact. The sensor component 914 may also include a light sensor, such as a CMOS or CCD image sensor, for use in imaging applications. In some embodiments, the sensor component 914 may also include an accelerometer sensor, a gyroscope sensor, a magnetic sensor, a pressure sensor, or a temperature sensor.

The communication component 916 is configured to facilitate communication, wired or wirelessly, between the terminal device 900 and other terminal devices. The terminal device 900 can access a wireless network based on a communication standard, such as WiFi, 2G, or 3G, or a combination thereof. In one exemplary embodiment, the communication component 916 receives a broadcast signal or broadcast associated information from an external broadcast management system via a broadcast channel. In one exemplary embodiment, the communication component 916 further includes a near field communication (NFC) module to facilitate short-range communications. For example, the NFC module may be implemented based on a radio frequency identifier (RFID) technology, an infrared data association (IrDA) technology, an ultra-wideband (UWB) technology, a Bluetooth (BT) technology, and other technologies.

In exemplary embodiments, the terminal device 900 may be implemented with one or more application specific integrated circuits (ASICs), digital signal processors (DSPs), digital signal processing terminal devices (DSPDs), applicationmable logic terminal devices (PLDs), field applicationmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 904, executable by the processor 920 in the terminal device 900, for performing the above-described methods. For example, the non-transitory computer-readable storage medium may be a ROM, a random access memory (RAM), a CD-ROM, a magnetic tape, a floppy disc, an optical data storage terminal device, and the like.

A non-transitory computer-readable storage medium having stored therein instructions that, when executed by a processor of a terminal device, cause the terminal device to perform a method which includes: acquiring a current application to be executed from an application chain; and executing the current application by determining an execution action according to an executable content type of the current application and an execution result of a preceding application executed before the current application.

Figure 10:
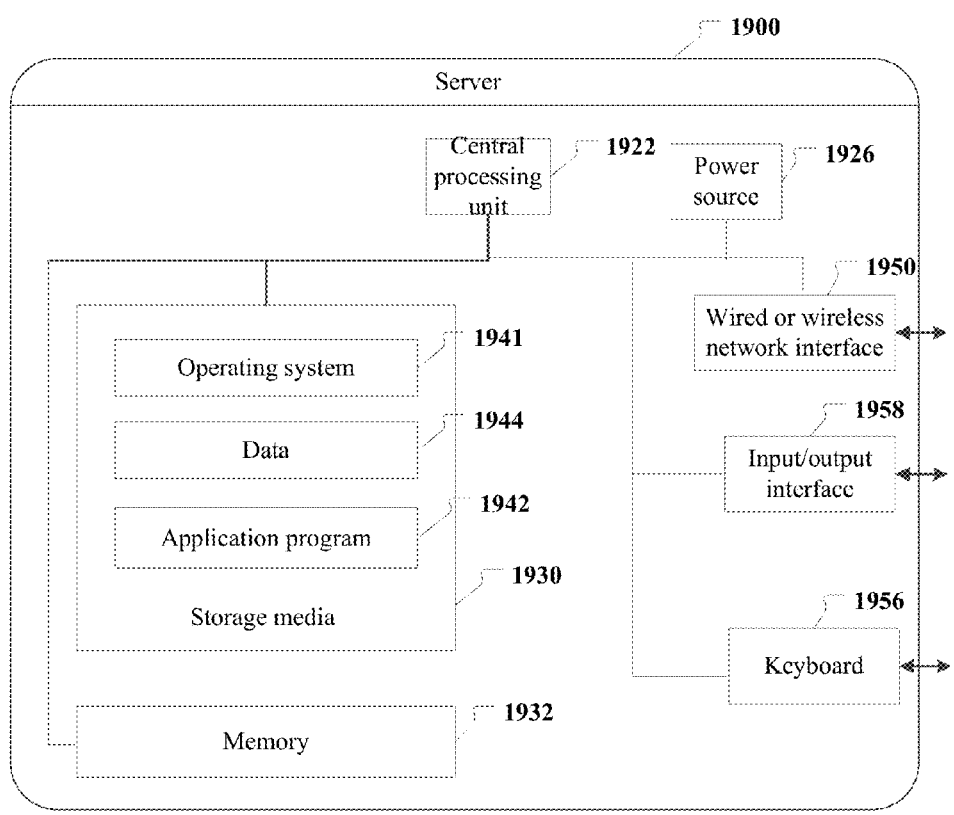
FIG. 10 is a structural diagram of a server according to an exemplary embodiment of the present disclosure.

FIG. 10 is a structural diagram of a server according to an embodiment of the present disclosure. The server 1900 may vary significantly due to different configurations or performances. It may include one or more central processing units (CPU) 1922 (for example, one or more processors), and a memory 1932, one or more storage media 1930 for storing application program 1942 or data 1944 (for example, one or more mass storage devices). Wherein, the memory 1932 and storage media 1930 may be transient storage or persistent storage. The programs stored in the storage media 1930 may include one or more modules (not shown in the figures), and each module includes operation corresponding to a set of instructions in the server. Further, the central processing unit 1922 may be configured to communicate with the storage media 1930, execute a set of instruction operations stored in the storage media 1930 on the server 1900.

The server 1900 may also include one or more power sources 1926, one or more wired or wireless network interfaces 1950, one or more input/output (I/O) interfaces 1958, one or more keyboards 1956, and/or, one or more operating systems 1941, such as Windows Server™, Mac OS X™, Unix™, Linux™, FreeBSD™, or the like.

Other embodiments of the present disclosure will be apparent to those skilled in the art from consideration of the specification and practice of the invention disclosed herein. This application is intended to cover any variations, uses, or adaptations of the disclosure following the general principles thereof and including such departures from the present disclosure as come within known or customary practice in the art. It is intended that the specification and embodiments be considered as exemplary only, with a true scope and concept of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for executing an application chain of multiple applications on a terminal device, comprising:
   acquiring the application chain in response to detecting a specific action or event on the terminal device that triggers an execution instruction of the application chain, wherein the application chain is preset by adding application identifier for each applications in a sequence;
   determining a current application to be executed according to the sequence of application identifiers in the application chain, wherein an application is set as the current application when a preceding application in the application chain has been executed or has begun to be executed;
   executing the current application by determining an execution action according to an executable content type of the current application and an execution result of the preceding application in the application chain, wherein the execution of the current application further comprises:
   determining whether the executable content type of the current application belongs to the executable content type of the preceding application if the preceding application is in execution and the execution result of the preceding application is pending;
   sending the execution result of the current application to the preceding application in execution while executing the current application if the executable content type of the current application belongs to the executable content of the preceding application;
   determining whether the execution result of the preceding application belongs to the executable content type of the current applications if the preceding application has completed execution; and
   setting the execution result of the preceding application as the content of the execution action of the current application and executing the execution action if the execution result of the preceding application belongs to the executable content type of the current application;
   setting a succeeding application of the current application in the application chain as the current application; and
   executing the application chain until all the applications in the application chain have been executed.

2. The method according to claim 1, wherein the application chain is preset by:
   detecting a movement instruction for any one of the application identifiers; and
   moving a selected application identifier to a target sequence position, wherein the sequence of the application corresponding to the moved application identifier moves to the target sequence position accordingly.

3. The method according to claim 1, wherein the current application to be executed from the application chain is acquired after detecting that the preceding application has been executed or the preceding application has begun to be executed.

4. The method according to claim 1, wherein when the executable content type of the current application comprises pictures or multimedia information, if the execution result of the preceding application that has been executed or has begun to be executed before the current application is generating pictures or multimedia information, then the generated pictures or multimedia information is served as the execution content at the time of executing the current application.

5. The method according to claim 1, wherein when the executable content type of the preceding application command comprises pictures or multimedia information, and when the preceding application is in execution and the execution result of the preceding application is pending, if pictures or multimedia information is generated when the current application is executed, then the execution result of the current application is sent to the preceding application in execution while executing the current application.

6. The method according to claim 1, wherein at the time of executing the current application, an interface of the current application is displayed.

7. A terminal device for executing an application chain of multiple applications, comprising:
   one or more processors;
   a memory for storing one or more instruction modules configured to be executed by the one or more processors, the one or more instruction modules comprising instructions for:
   acquiring the application chain in response to detecting a specific action or event on the terminal device that triggers an execution instruction of the application chain, wherein the application chain is preset by adding application identifier for each applications in a sequence;
   determining a current application to be executed according to the sequence of application identifiers in the application chain, wherein an application is set as the current application when a preceding application in the application chain has been executed or has begun to be executed;
   executing the current application by determining an execution action according to an executable content type of the current application and an execution result of the preceding application in the application chain, wherein the execution of the current application further comprises:
   determining whether the executable content type of the current application belongs to the executable content type of the preceding application if the preceding application is in execution and the execution result of the preceding application is pending;

sending the execution result of the current application to the preceding application in execution while executing the current application if the executable content type of the current application belongs to the executable content of the preceding application;

determining whether the execution result of the preceding application belongs to the executable content type of the current applications if the preceding application has completed execution; and setting the execution result of the preceding application as the content of the execution action of the current application and executing the execution action if the execution result of the preceding application belongs to the executable content type of the current application;

setting a succeeding application of the current application in the application chain as the current application; and executing the application chain until all the applications in the application chain have been executed.

8. The terminal device according to claim 7, wherein the application chain is preset by:

detecting a movement instruction for any one of the application identifiers; and moving a selected application identifier to a target sequence position, wherein the sequence of the application corresponding to the moved application identifier moves to the target sequence position accordingly.

9. The terminal device according to claim 7, wherein the current application to be executed from the application chain is acquired after detecting that the preceding application has been executed or the preceding application has begun to be executed.

10. The terminal device according to claim 7, wherein when the executable content type of the current application comprises pictures or multimedia information, if the execution result of the preceding application that has been executed or has begun to be executed before the current application is generating pictures or multimedia information, then the generated pictures or multimedia information is served as the execution content at the time of executing the current application.

11. The terminal device according to claim 7, wherein when the executable content type of the preceding application command comprises pictures or multimedia information, and when the preceding application is in execution and the execution result of the preceding application is pending, if pictures or multimedia information is generated when the current application is executed, then the execution result of the current application is sent to the preceding application in execution while executing the current application.

12. A non-transitory computer-readable storage medium having stored therein instructions that, when executed by one or more processors of a terminal device, causes the terminal device to perform a method for executing an application chain of multiple applications, wherein the method comprises:

acquiring the application chain in response to detecting a specific action or event on the terminal device that triggers an execution instruction of the application chain, wherein the application chain is preset by adding application identifier for each applications in a sequence;

determining a current application to be executed according to the sequence of application identifiers in the application chain, wherein an application is set as the current application when a preceding application in the application chain has been executed or has begun to be executed;

executing the current application by determining an execution action according to an executable content type of the current application and an execution result of the preceding application in the application chain, wherein the execution of the current application further comprises:

determining whether the executable content type of the current application belongs to the executable content type of the preceding application if the preceding application is in execution and the execution result of the preceding application is pending;

sending the execution result of the current application to the preceding application in execution while executing the current application if the executable content type of the current application belongs to the executable content of the preceding application;

determining whether the execution result of the preceding application belongs to the executable content type of the current applications if the preceding application has completed execution; and setting the execution result of the preceding application as the content of the execution action of the current application and executing the execution action if the execution result of the preceding application belongs to the executable content type of the current application;

setting a succeeding application of the current application in the application chain as the current application; and executing the application chain until all the applications in the application chain have been executed.

* * * * *